No. 687,378. Patented Nov. 26, 1901.
D. F. LEAHY.
HOSE NOZZLE.
(Application filed May 22, 1901.)

(No Model.)

Witnesses

Daniel F. Leahy
Inventor
By
Attorney

UNITED STATES PATENT OFFICE.

DANIEL F. LEAHY, OF SAN FRANCISCO, CALIFORNIA.

HOSE-NOZZLE.

SPECIFICATION forming part of Letters Patent No. 687,378, dated November 26, 1901.

Application filed May 22, 1901. Serial No. 61,381. (No model.)

*To all whom it may concern:*

Be it known that I, DANIEL F. LEAHY, a citizen of the United States, residing at San Francisco, in the county of San Francisco and State of California, have invented certain new and useful Improvements in Nozzles; and I do hereby declare the following to be a full, clear, and exact description of the invention, such as will enable others skilled in the art to which it appertains to make and use the same.

My invention relates to certain improvements in pipe or hose nozzles, more especially designed for water-spraying purposes, as sprinkling lawns, gardens, &c. It has for its object, among other things, to effect the maximum spraying of the water with the proportionately increased flow or action of the same; also, it is adapted for ready retention in place when in operation without the aid of the hand and is cheaply manufactured, simple, and readily manipulated.

The nature of the invention consists of the detailed construction and arrangement of parts, all substantially as hereinafter more fully disclosed, and specifically pointed out by the claims.

Figure 1:
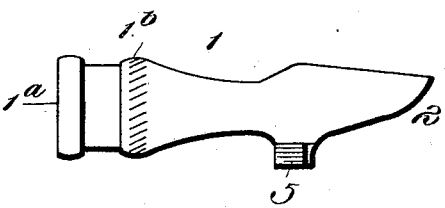
Figure 2:
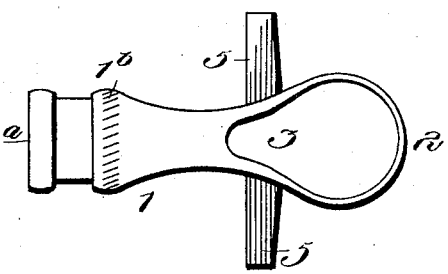
Figure 3:
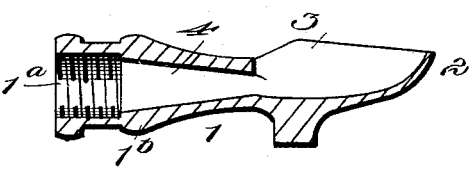
Figure 4:
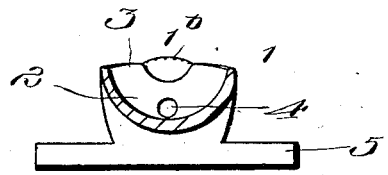

In the accompanying drawings, illustrating the preferred embodiment of my invention, Figure 1 is a perspective view thereof. Fig. 2 is a plan view. Fig. 3 is a longitudinal section. Fig. 4 is a cross-section taken through the delivery end or mouth of the nozzle.

In carrying out my invention I provide the nozzle 1 with an inner end socket $1^a$, adapted to be connected in the usual way to the coupling-sleeve of a hose. Said nozzle may have contiguous to said socket a milled or roughened raised surface, as $1^b$, to facilitate the coupling of the nozzle to the hose-sleeve. Said nozzle is also tapered upon its exterior from said milled raised surface forward a short distance, and from the outer terminus of this taper it is produced in substantially the form shown or similarly, as at 2, it resembling the shape of the bowl of a spoon or scoop. The bowl or mouth thus formed is preferably concaved, especially upon its inner bottom surface, and continuously curved upward and outward from said bottom surface. It also flares and is curved from its pronouncedly contracted inner end, where it receives the water or stream from the nozzle-bore, forward a suitable distance from said end, rising or extending upward, with its upper forward edge, as also its lateral edges, standing considerably above the plane of the nozzle-bore. This has the effect to cause the symmetrical spreading and rising of the water as it issues from the nozzle-bore and impinges against the surface of the bowl or mouth above the upper edges of said mouth or end, and the falling of the spray thus produced thereover expansively effecting the maximum delivery of said spray or water. Said nozzle-mouth in addition to the aforesaid construction, wherein it is thus far distinguished from anything which has ever heretofore preceded it, is further characterized therefrom in the fact of being open throughout its entire otherwise upper surface from its point of connection with the nozzle-bore clear out to its upper forward edge and its entire cross-sectional area, as shown at 3 in the plan view. As a result of the foregoing the water as it shoots from the bore with great force, not only impinging upon the inner forward surface of the mouth, but also striking the same laterally, will be accordingly sprayed upward therethrough both forwardly and laterally, additionally increasing the spraying capacity of said nozzle-mouth, consequently providing for the application of the spray or water to the maximum area. The bore 4 of said nozzle is tapered from its initial point or inner end and throughout the entire length or longitudinal section of the tapered portion of the nozzle clear to the mouth thereof and discharges at its most reduced diameter into said mouth, thus accelerating or augmenting the force of the passage of the water into the last named, still further increasing the spraying capabilities of the device.

The nozzle has preferably cast with its mouth or delivery end portion upon the under side a cross-piece or base 5, projecting laterally to provide for the proper disposing or inclining of said nozzle to elevate its mouth or delivery end when resting upon the lawn or elsewhere, the purpose of which is apparent.

Having thus fully described my invention, what I claim, and desire to secure by Letters Patent, is—

1. A hose-nozzle spoon-bowl shaped in general outline with its mouth or delivery end opening upward throughout in the horizontal, and flared forward from an inner contracted portion at its union with the nozzle-bore, and concaved laterally and forward, its forward surface intercepting the longitudinal section or plane of said bore, substantially as set forth.

2. A hose-nozzle spoon-bowl shaped in general outline with an outward or forward tapered bore, and its mouth opening upward throughout in the horizontal, and flared forward from an inner contracted portion at its union with the nozzle-bore, and concaved laterally and forward, its forward surface intercepting the longitudinal section or plane of said bore, the contracted delivery end of said bore discharging into said mouth or end, substantially as set forth.

In testimony whereof I affix my signature in presence of two witnesses.

DANIEL F. LEAHY.

Witnesses:
LEE D. CRAIG,
W. D. HIXSON.